March 20, 1962 H. C. MILLER 3,025,726
METHOD OF MOUNTING DIAMONDS IN TOOL SHANKS AND OTHER HOLDERS
Filed July 11, 1960 5 Sheets-Sheet 1

INVENTOR.
HAROLD C. MILLER
BY
ATTY.

March 20, 1962  H. C. MILLER  3,025,726
METHOD OF MOUNTING DIAMONDS IN TOOL SHANKS AND OTHER HOLDERS
Filed July 11, 1960  5 Sheets-Sheet 3

INVENTOR.
HAROLD C. MILLER
BY
ATTY.

March 20, 1962 H. C. MILLER 3,025,726
METHOD OF MOUNTING DIAMONDS IN TOOL SHANKS AND OTHER HOLDERS
Filed July 11, 1960 5 Sheets-Sheet 5

INVENTOR.
HAROLD C. MILLER
BY
ATTY ing other holders, and to this end it contemplates the provision of a method which will obviate the necessity of working a diamond to final shape and size prior to mounting it in the shank or holder and which, as a natural corollary, will eliminate the high degree of skill which heretofore has been required in effecting proper orientation of the diamond.

3,025,726
METHOD OF MOUNTING DIAMONDS IN TOOL SHANKS AND OTHER HOLDERS

Harold C. Miller, Chicago, Ill., assignor to Super-Cut, Inc., Chicago, Ill., a corporation of Illinois
Filed July 11, 1960, Ser. No. 41,832
4 Claims. (Cl. 76—101)

The present invention relates to a method of mounting diamonds in tools to the end that the diamonds, when mounted, will be precisely oriented with reference to their crystallographic axes and the axes of the tools within which they are mounted in order that they will give improved performance, or perform in a predetermined and desired manner when the tools, i.e., the diamond-carrying shanks, are put to use in performing useful work.

A diamond which has been mounted in a tool in accordance with the principles of the present invention, not only will give the improved or desired character of performance, but it will assume a position in the tool relative to the tool outline which will enable a wide variety of work to be performed upon the diamond in reconditioning the tool without removing the diamond from the tool or otherwise disturbing the precisely oriented position thereof in the tool. Additionally, in practicing the present method, in the manufacture of any given tool, during the fashioning of the tool, all diamond shaping operations, including the final polishing of the diamond, may be performed upon the diamond in situ after the same has been permanently mounted in the tool with its crystallographic axes oriented precisely as they will be oriented in the finished tool.

The mounting of diamonds in tools according to the present method affords a still further advantage in that in instances where reconditioning operations in situ are not feasible due to the embedded condition of the diamond resulting from previous reconditioning operations, alteration of the tool outline may be resorted to without disturbing the crystallographic orientation of the diamond relative to the tool axis, such alteration serving to expose for reconditioning purposes, i.e., for further shaping operations, portions of the diamond hitherto inaccessible to the reconditioning tool or tools. Then, with fresh portions of the diamond thus accessible, reshaping operations in situ may be carried out. Alteration of the tool outline is made possible in either of two different ways. If it is specified that the tool shank height be a given unvarying dimension, a rearrangement of the tool outline may be resorted to. Since the present method involves the fashioning of the composite tool in two parts, it is possible to relocate one of the parts relative to the other in such a manner as to expose hitherto embedded portions of the diamond for lapping or repolishing purposes. If the height of the tool shank be not specified, it is then possible to grind away portions of the shank to thus expose fresh portions of the diamond for lapping or repolishing purposes.

The methods currently employed in the mounting of diamonds in tools are as varied as are the talents of the operators who practice them and, invariably, they are dependent upon a high degree of skill which can be attained only by long experience and upon rare judgment in visually interpreting the indications which may be found on the surface or within the internal structure of a diamond. Even when a particular stone does present visible indications of its crystallographic structure, the proper interpretation of these indications and the techniques involved in handling the diamond during mounting operations leave much to chance so that when the diamond is finally mounted, orientation within solid angles of 15° with respect to the three crystallographic axes of the stone is all that can be expected. It is not within the scope of the present application to outline all of the various techniques involved in present day diamond mounting operations, but it is deemed pertinent to outline at least one of the more common procedures inasmuch as a full understanding of the advantages of the present method and of the tools resulting therefrom may best be had by comparison with such procedure. In the manufacture of diamond-carrying tools of the type with which the present invention is concerned, according to conventional methods, the diamond is invariably totally shaped to completion and after shaping thereof, it is inserted or wedged into a slot which has previously been sawed in the forward end of the tool shank. Thereafter, the diamond is affixed in position within the slot by a soldering or brazing operation. The slot usually is rectangular and the metal immediately above and immediately below the diamond acts in the manner of a vise to exert a jaw-clamping action on the diamond to hold it securely in position.

The disadvantages of such conventional methods are numerous, and principal among them is the fact that for diamond reconditioning operations, the diamond must be removed from its lodged position within the slot, reconditioned separately, and then replaced in the slot. Assuming for purposes of discussion that the diamond has initially been installed within the shank slot with a reasonably accurate or effective degree of orientation, this orientation is lost when the diamond is unsoldered and it is extremely unlikely that, after new surfaces have been generated upon the diamond, the same degree of accuracy in orientation can be preserved when the diamond is replaced in the slot and resoldered therein. Equally as serious is the fact that in the replacement of the reconditioned diamond, the soldering operation requires removal of excess metal. Few artisans possess the skill which is necessary for such solder-removing operations, and since the slightest touch of the cutting edge of the diamond with a file will usually render the diamond worthless, diamond losses in this manner is an economic factor which every toolmaker must reckon with.

Not only do such conventional methods present serious obstacles to relapping or repolishing of the diamond, but the techniques involved during initial preparation of the diamond for mounting, during preparation of the shank for the reception of the diamond, and during the actual installation of the diamond in the prepared shank, require a high degree of skill and, thus, leave much to chance so that when the diamond is finally mounted, orientation within solid angles of 15° with respect to the three crystallographic axes thereof is all that can reasonably be expected.

Apart from the difficulties involved in the initial installation of the diamond in a given mounting, and in the repolishing and reinstallation of the diamond in the tool shank, conventional mountings are such that relapping or repolishing of the diamond in situ are precluded. Due to the presence of metal both above and below the diamond, which is necessary to create the gripping action above referred to, the flat upper surface of the diamond, which is commonly referred to as the table, and which is the last surface on the diamond to be polished, invariably is below the upper surface of the tool shank and, therefore, cannot conveniently be reached by the polishing tool. To render this table accessible for polishing operations, the diamond must be removed from its mounting as previously described. This is true regardless of the angle of the table which may be horizontal, or which may be tossed forwards or backwards to produce a negative or a positive rake respectively.

The present invention is designed to overcome the above-noted limitations that are attendant upon conventional methods of mounting diamonds in tool shanks and other holders, and that are attendant upon the construction, design and use of such tool shanks. Toward this end, the invention contemplates the provision of a novel method whereby a diamond may be initially installed in the tool shank with a precise degree of orientation according to a predetermined desired placement of the diamond, wherein the skilled handling of the diamond for placement purposes at any stage in the process is eliminated, and wherein initial diamond shaping operations may be accomplished with the diamond in situ within the shank. Also, toward the same end, the invention contemplates the provision of a method which is capable of producing a novel diamond tool wherein reconditioning of the diamond may be accomplished with the diamond in situ within the tool, either by grinding portions of the shank to expose fresh portions of the diamond, or by relocating the diamond in the tool as set forth above.

In accomplishing these aims, the invention contemplates the use of a method which, broadly, embodies certain principles which are involved in connection with the method of mounting diamonds in tool shanks shown and described in my prior United States Patent No. 2,896,477, dated July 28, 1959 and entitled "Method of Mounting Diamonds in Tool Shanks and Other Holders," and over which method the present one is an improvement. In this patent, there is disclosed a method wherein a diamond is initially affixed to a temporary positioning dop having fixed fiducial reference indicia establishing reference axes for the dop; the diamond on the dop subjected to a beam of X-rays to obtain a crystal diffraction pattern of the diamond; the deviation of the crystallographic axes of the diamond from the fiducial reference axes of the dop ascertained on the basis of the diffraction pattern; a transfer holder having fixed reference indicia thereon establishing fixed reference axes for the holder brought into juxtaposition with the temporary dop with the references axes of the holder being displaced angularly from the respective fixed reference axes of the dop by amounts equal to the ascertained deviation of axes; the diamond affixed to the holder and loosened from the dop; the end of the holder carrying the diamond inserted in a mold cavity likewise having fixed reference indicia establishing reference axes of the cavity; and finally, pouring molten metal into the mold cavity and allowing the same to harden to embed the diamond in the resultant metal slug. Throughout the various transfer operations, the fiducial reference indicia of the initial mounting dop is carried forward, so to speak, to the final mount.

The method of the present invention similarly makes use of such a carrying forward of the fiducial reference indicia in effecting certain diamond-transfer operations. Briefly, in the construction and assembly of any given mounting, the diamond is first hot-pressed or cast into a suitable slug (which later is fashioned into a shank-insert) in such a manner that one crystallographic plane of the diamond will be substantially parallel to an end face of the slug. No particular care need be exercised in this positioning the diamond in the slug and one convenient method by means of which the embedding of the diamond may be performed is to position the diamond on one end of a temporary dop and cement the diamond in place. Thereafter, the end of the dop carrying the diamond is inserted in a hot-press mold, the mold filled with molding powder, and the slug pressed so that it will contain the diamond with at least a small area of the diamond exposed. Suitable fiducial reference indicia may be inscribed upon the slug to establish the slug direction relative to certain X-ray apparatus subsequently employed in the process. The slug with the diamond thus mounted therein is then accurately positioned in a fixture having counterpart fiducial indicia, and the diamond is brought into register with the collaminator tube of a conventional diffraction X-ray apparatus. The exposure is made and an X-ray diffraction pattern is obtained.

The diamond which has thus been embedded in the slug remains permanently embedded and portions of the metal of the slug are intended to become, for all practical purposes and intents, an integral part of the finished composite tool. Accordingly, the slug is milled to provide thereon two flat surfaces designed for register and contact with two counterpart flat surfaces provided on an elongated shank body. These two surfaces preferably, but not necessarily, are disposed at an angle of 90° to each other and they are so disposed relative to the diamond which is partially embedded in the slug that they will extend in predetermined directions relative to the crystallographic axes of the diamond. Such milling of the slug is performed by placing the slug in a goniometer vise having counterpart fiducial reference indicia for the fiducial reference indicia on the slug, and then reading the X-ray diffraction pattern and placing correction readings for the three crystallographic axes of the diamond in the three scales of the goniometer vise so that the diamond will set true to space with reference to any one of the standard atomic planes of the diamond such as the (100) cube plane, the (110) dodecahedron plane, or the (111) octahedron plane. The particular plane selected will, of course, be determined by the overall design of the tool. The planes referred to above are from the system of crystallographic notation known as the Miller Indices, as described in a publication entitled "Mineralogy" by Kraus, Hunt & Ramsdell, published by McGraw-Hill Book Company of New York, fourth edition (1951), pages 15 and 16. Reference to my above-mentioned Patent No. 2,896,477 may be had for a discussion of the use of these crystallographic planes for diamond-orientation purposes in connection with the mounting of diamonds in tool shanks so that a detailed reference to the McGraw-Hill publication is not necessary for an understanding of the present invention.

Leaving the slug and its embedded diamond in the adjusted goniometer device, the milling tool is passed across the slug, first, in a direction to generate one of the two flat surfaces mentioned, and thereafter, the tool is passed across the slug in a direction to generate the other flat surface. Conveniently, these two surfaces may be milled so as to extend horizontally and vertically respectively with respect to space.

To prepare the shank for assembly with the now milled slug, a recess is milled in one end of the elongated shank body, the recess being shaped so as to be commensurate with the milled surfaces on the slug. To accommodate surfaces which extend at an angle of 90° to each other, a 90° notch will be milled in the end of the shank. This may conveniently be performed in the goniometer vise and in so milling the shank, the notch may be disposed at such compound angles relative to the axis of the shank as to cause the diamond to assume the desired position of orientation in the completed tool after the two milled surfaces on the slug have been brought into register with their counterpart surfaces (i.e., the flat sides of the notch) on the shank.

Finally, with the two milled surfaces on the slug in face-to-face contact with the two counterpart surfaces on the shank, the parts are permanently secured together by the application thereto of silver solder or other bonding agent and the thus assembled composite shank with the diamond embedded therein and properly oriented relative to the shank outline, may be shaped by conventional operations to remove excess metal and give to the tool the desired working contour.

In practicing the above method, it is possible, by controlling the depth of the notch which is milled in the shank, to cause the diamond to be finally oriented in the composite tool so that it presents a table portion which projects above the uppermost surface of the shank so that no interference will be offered by any portion of the shank to a lapping or polishing tool which may be applied to such table portion when initially lapping or polishing the diamond or when reconditioning the same in situ within the shank. Furthermore, after a given diamond has become worn to such an extent that it is no longer feasible to effect lapping or polishing of such table portion, the diamond may be readjusted so as to expose fresh portions thereof for table lapping purposes, as well as for other diamond-shaping operations, by the simple expedient of unsoldering the shaped slug or insert and sliding the same forwardly and upwardly in the notch, utilizing the upper overlying inclined face of the notch as a guide to preserve the orientation of the diamond. Thereafter, a shim may be interposed between the insert and the other side of the notch to preserve the diamond orientation, and resoldering operations resorted to, after which relapping or repolishing operations may be performed upon the diamond in situ as heretofore.

The provision of a method of mounting a diamond in a tool in the manner briefly outlined above, being among the principal objects of the invention, numerous other objects and advantages of the invention, not at this time enumerated, will become readily apparent as the nature of the invention is better understood.

In the accompanying five sheets of drawings forming a part of this specification, one illustrative embodiment of the composite diamond mount constructed in accordance with the principles of the present method, together with certain equipment employed in practicing the method, have been shown.

Referring now to the drawings in detail and in particular to FIGS. 1 to 6, inclusive, it is deemed necessary for a full understanding of the method which comprises the present invention to recognize the aims sought to be accomplished by the method. For this purpose an understanding of the character of the various tools capable of being produced by the method is necessary. Accordingly, in FIGS. 1 to 5, inclusive, a typical composite tool made according to the method of the present invention has been shown and designated in its entirety at 20.

Figures 7, 8, 9, 10, 11, 12, 13:
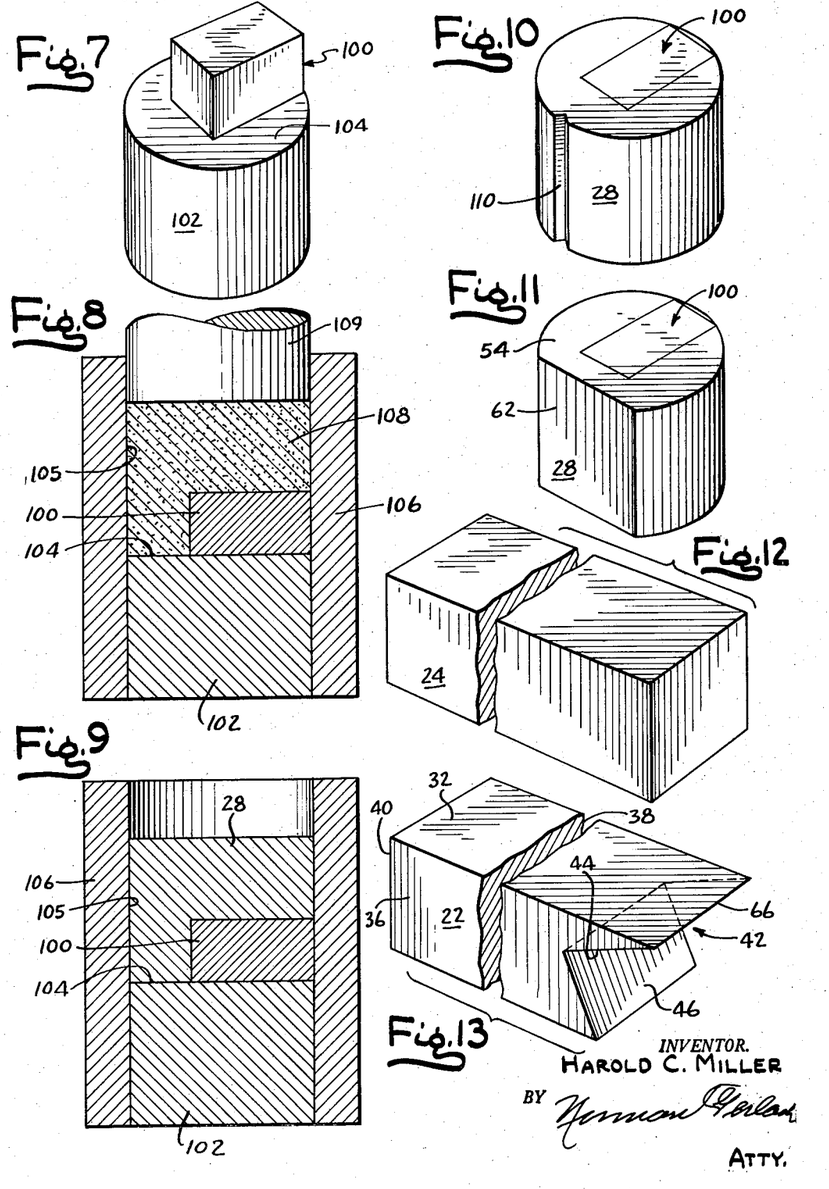
FIG. 7 is a perspective view of a temporary mounting dop employed in practicing the present method.
FIG. 8 is a sectional view taken substantially centrally and vertically through a hot-press mold employed in connection with the present invention.
FIG. 9 is a sectional view similar to FIG. 8 showing the mold after pressing operations are complete.
FIG. 10 is a perspective view of a slug which has been created by the mold of FIGS. 8 and 9.
FIG. 11 is a perspective view similar to FIG. 10 showing the slug after a flat reference surface has been milled thereon according to the present method.
FIG. 12 is a fragmentary perspective view of one end of a piece of shank stock prior to milling operations thereon.
FIG. 13 is a fragmentary perspective view similar to FIG. 12 showing the shank stock after milling operations thereon have been completed.
Figure 14:
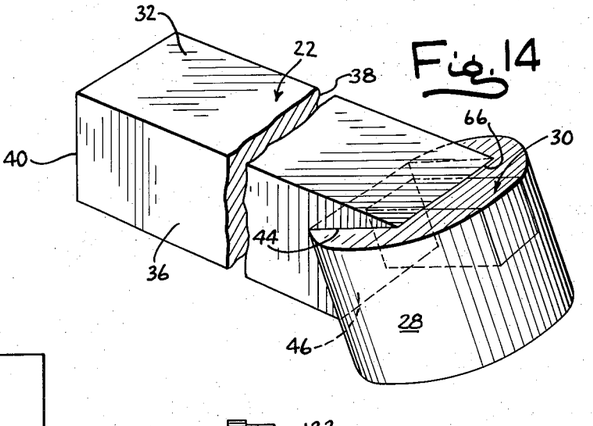
FIG. 14 is a perspective view showing the slug of FIG. 10 and milled shank of FIG. 13 operatively assembled upon each other.

The tool 20 is of a composite nature and it is comprised of two parts, namely, a shank proper 22 which is formed from a length of shank stock such as has been shown at 24 in FIG. 12, and a diamond-carrying shank insert 26, which is fashioned from a hot-pressed slug such as has been shown at 28 in FIG. 10. The two parts 22 and 26 are assembled upon each other and are releasably maintained in their assembled relationship by a silver soldering operation or its equivalent to produce the completed composite tool assembly 20. The diamond or cutting tool proper is designated in its entirety at 30 and it is partially embedded in the insert 26. In the completed tool, it assumes an operative cutting position at the extreme forward end of the tool with its crystallographic axes precisely oriented relative to the shank outline so that the cutting edge or radius thereof will engage the work at a predetermined cutting angle and at the same time offer to the work the desired cutting qualities. The purpose of maintaining the two parts 22 and 26 releasably assembled is to enable them to be relocated, each relative to the other, by the use of shims in a manner and for a purpose that will be made clear presently.

Throughout this specification and in the claims appended thereto, for purposes of description, the composite assembly including the shank proper 22, the member 26 at the forward end thereof, and the diamond 30 which is partially embedded in the member 26, will be referred to as the tool. The member 26, after it has been completely shaped so that it assumes the form shown in FIGS. 1 to 4, inclusive, will be referred to as the insert, but prior to the complete shaping thereof, it will be referred to as the slug and designated at 28 (FIGS. 9, 10, 11 and 14). The shank proper 22, in the interests of brevity, will be referred to simply as the shank.

Figure 1:
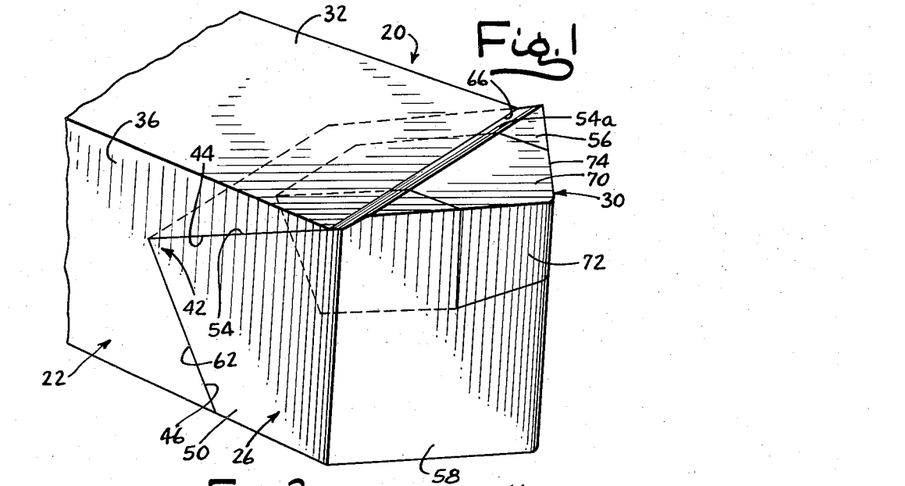
FIG. 1 is a fragmentary perspective view of a composite tool constructed according to the method of the present invention.
Figure 2:
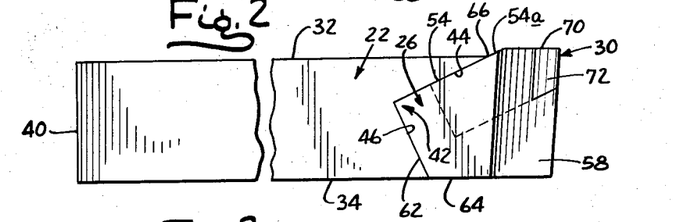
FIG. 2 is a side elevational view of the structure shown in FIG. 1.
Figure 3:
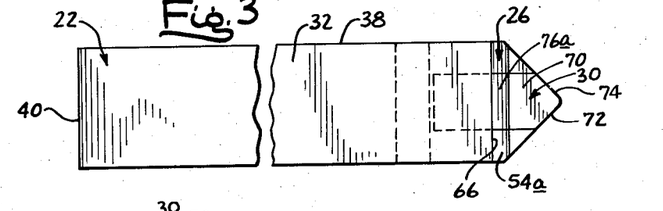
FIG. 3 is a top plan view of the structure shown in FIG. 1.
Figure 4:
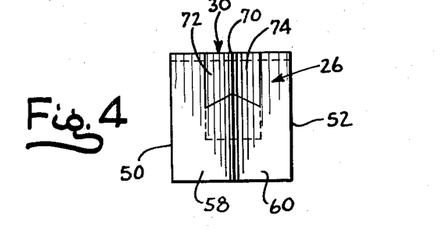
FIG. 4 is a front end view of the structure shown in FIG. 1.

As best seen in FIGS. 1 to 3, inclusive, the shank 22 is, for illustrative purposes, shown as being formed from shank stock which is rectangular in transverse cross section, but it will be understood that the method of the present invention is applicable to the mounting of diamonds in tool shanks which are otherwise polygonal, circular or otherwise curved in transverse cross section. The rectilinear shank 22 shown herein for illustrative purposes is of elongated design and it is provided with a flat horizontal top face 32, a flat horizontal bottom face 34, an vertical side faces 36 and 38, respectively. The rear end face 40 of the shank 22 is vertical. Again, for descriptive purposes herein, directional references, unless otherwise specified or otherwise related referencewise, will refer to directions in space, it being assumed that the tool shank 20 will be applied to the work with its upper face 32 extending in a horizontal plane in space.

The forward end of the shank 22, in the illustrated form of tool, is provided with a transversely extending notch 42 (FIGS. 13 and 15) presenting a downwardly facing, forwardly and upwardly inclined face 44 and an upwardly facing, forwardly and downwardly inclined face 46. The two faces 44 and 46 extend at a right angle to each other and each face extends at a right angle to the side faces 36 and 38.

Figure 15:
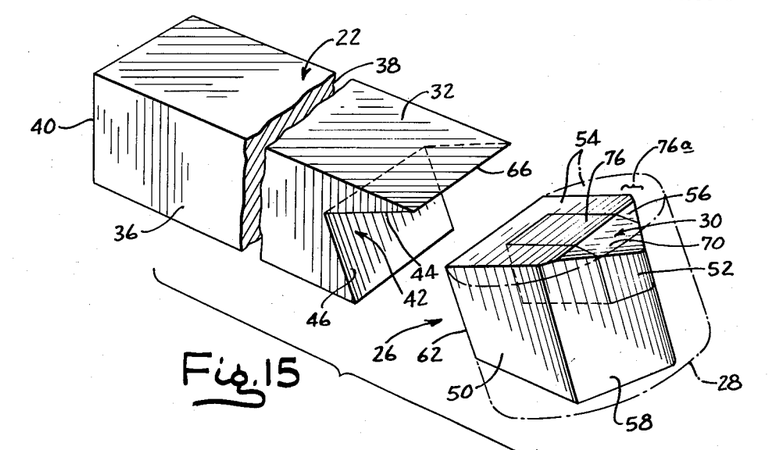
FIG. 15 is an exploded perspective view similar to FIG. 14 illustrating the manner in which the principal parts of the assembly of FIG. 14 are milled to produce the completed composite tool assembly.

The insert 26 is nested within the notch 42 in a manner that will be made clear presently and it is shown in a detached condition in full lines in FIG. 15. This insert 26 is shaped from the slug 28 of FIG. 10 according to the present method and as will be described subsequently. It is provided with vertical trapezoidal side faces 50 and 52 which are coplanar with, and constitute extensions of, the side faces 36 and 38, respectively, of the shank 22. The insert is further formed with an upwardly facing, forwardly and upwardly inclined rectangular upper face 54, a triangular horizontal face 56, a pair of rectangular forwardly and upwardly inclined front faces 58 and 60 which converge toward each other, a rearwardly and upwardly inclined face 62, and a horizontal bottom face 64, all of the faces being planar.

The rear face 62 and inclined face 54 extend at a right angle to each other and these two faces are commensurate in size and outline to the size and outline of the faces 46 and 44, respectively, of the notch 42 provided in the shank 22. The faces 62 and 54 are fixedly secured to the faces 46 and 44, respectively, and are coextensive therewith, the union preferably being made by a silver soldering operation. The extent of the inclined face 54 in a direction generally lengthwise of the shank is somewhat greater than the length of the forwardly and upwardly inclined face 44 of the notch 42 and, thus, when the two parts 22 and 26 are assembled upon each other, a narrow section 54a of the face 54 remains exposed and projects forwardly and upwardly beyond the transverse edge 66 which exists between the juncture of the faces 44 and 32.

The diamond 30 is partially embedded in the insert 26 near the upper regions of the latter and adjacent the forward end thereof. The diamond exhibits an exposed table portion 70 which is coplanar with the triangular face 56, and it exhibits exposed undercut flanks 72 and 74 (FIG. 4) which are coplanar with the faces 58 and 60, respectively. The diamond also exhibits a face 76 (FIG. 15) which is exposed relative to the face 54 with which it is coplanar. Only a small area 76a of the face 76 is exposed when the parts 22 and 26 are assembled. This area has been bracketed in FIG. 15 to indicate the normal width thereof.

It has been stated previously that the diamond 30, when the parts 22 and 26 are assembled, assumes a position in the composite tool 20 with its crystallographic axes precisely oriented relative to the tool outline so that predetermined cutting action will be effected when the diamond is applied to the work. This orientation of the diamond in the completed shank is due partly to its position in the insert 26 and partly to the position the compact 26 assumes relative to the outline of the shank 22. As will become clear presently, according to the present method, the diamond is given a predetermined position in the slug 28 (which subsequently is machined after application to the shank to produce the insert 26), and the predetermined orientation which the diamond is to assume in the final tool is effected by cutting the notch 42 at an angle commensurate with ascertained design data involving the desired coordinate axes of the shank. In the illustrated form of the tool 20, the notch 42 is cut so that both sides 44 and 46 thereof extend at a right angle to spaced vertical planes, i.e., the side faces 36 and 38 of the shank 22. Such cutting of the notch is predicated upon design angles of zero magnitude for two of the coordinate axes of the shank and upon a design angle of positive value for the third coordinate axis. It should be understood that positive or negative correction angles may be involved for any of the three basic atomic planes of the diamond, in which case the sides 44 and 46 of the notch may extend at various acute angles to the vertical sides of the shank. As will also become clear presently, the machining of the slug 28 with the diamond 30 embedded therein is effected after the slug has been affixed in the notch 42, all excess metal outside the outline or confines of the completed tool being removed to produce the outline of the insert shown in FIG. 1. The polishing of the table portion 70 of the diamond, together with the surface 56 of the compact, is the last shaping operation which is effected and, usually, these coplanar surfaces will extend horizontally in space and will be parallel to the longitudinal axis of the shank 22, as well as lying above the uppermost edge or face of the shank. However, these coplanar surfaces may deviate by small rake angles from the horizontal, but in any event, the extended plane thereof will not intersect the body of the shank. Thus, the shank 22 will offer no interference to the polishing tool, either during initial polishing of the table 70 or during reconditioning of the diamond so that these operations may be effected with the diamond in situ within the tool shank.

Figure 5:
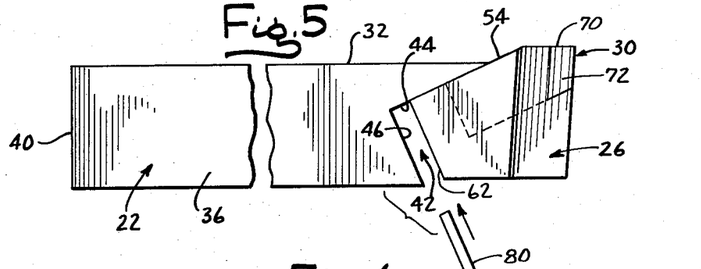
FIG. 5 is a side elevational view, somewhat schematic in its representation, of the tool shown in FIG. 1 and illustrating the manner in which the outline of the composite tool may be altered by rearrangement of the sections which cooperate to make up the tool.

Under certain circumstances, it may be necessary to raise the overall level of the diamond, and consequently, of the table portion 70 thereof, before the latter can be repolished without interference to the polishing tool. This may be accomplished either by grinding the upper face 32 of the shank 22 with the insert 26 and its embedded diamond in situ, thus in effect raising the level of the diamond table 70. Such a procedure is resorted to in instances where the height of the shank is not specified. However, if the height of the shank 22 is specified, it is then necessary to melt the silver solder which bonds the insert 26 in place by the application of heat and then slide the insert 26 forwardly and upwardly as illustrated in FIG. 5, utilizing the face 44 of the notch 42 as a guide to, in part, maintain the orientation of the insert 26 in space. Utilizing a flat shim such as has been shown at 80, or utilizing plural shims, the thus raised insert may again be soldered in position and the notch face 46 will serve to complete the orientation of the insert 26 so that it corresponds with the initial orientation thereof in the tool shank 20. Since the purpose of the rearrangement of the insert 26 relative to the shank 22 is to raise the level of the table portion 70 of the diamond 30, it follows that the upper face 44 of the notch 42 will always be disposed at such an angle that it is inclined generally forwardly and upwardly, albeit not necessarily directly forwardly, as in the illustrated form of shank 20.

Figure 6:
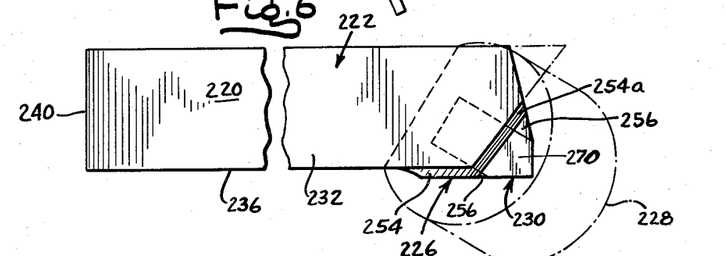
FIG. 6 is a top plan view, similar to FIG. 3, showing another form of composite tool constructed according to the present method.
Figure 18:
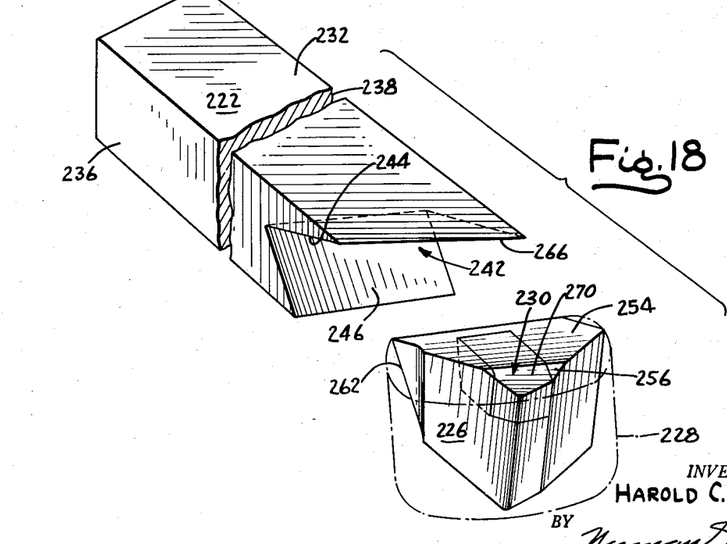
FIG. 18 is an exploded perspective view similar to FIG. 15 illustrating the manner in which the principal parts of the assembly of FIG. 6 are milled to produce the completed tool assembly.

In FIGS. 6 and 18, a modified form of tool 220 has been illustrated, this form of tool likewise being susceptible to formation according to the principles of the present method. The tool 220 is comprised of the same principal parts as is the tool 20 previously described and, therefore, to avoid needless repetition of description, similar characters of reference but of a higher order have been applied to the parts in FIGS. 6 and 18 which correspond to similar parts in FIGS. 1 to 5, inclusive.

The tool 220 is of a composite nature and includes the shank proper 222, the shank insert 226, and the diamond or cutting tool proper 230. The insert 26 may be formed from a hot-pressed slug such as has been shown at 228 in FIG. 18. The slug 228 is formed precisely in the same manner as the slug 28 is formed, but it is oriented differently relative to the shank 222 at the time of assembly thereon. In this form of tool 220, it is desired that the diamond be displaced laterally from the longitudinal axis of the shank 222 and that it be disposed with its effective cutting edge or cutting radius extending at an angle to such axis so that the diamond protrudes outwardly beyond the rectilinear confines of the shank 222. Whereas, in connection with the tool 20 of FIGS. 1 to 5, inclusive, cutting of the notch 42 in the shank 22 is predicated upon design angles of zero magnitude for two of the basic crystallographic planes of the diamond, cutting of the notch 242 in the tool 222 is based upon the use of positive value design angles for all three such basic planes, these values being placed in the scales of the goniometer vise 150 prior to cutting of the sides 244 and 246 of the notch 242. The notch thus extends diagonally across the front end face of the shank 222 and assumes the necessary tilt angle commensurate with the desired tool outline.

The shape of the slug 228 is exactly the same as the shape of the slug 28, assuming the tools 220 and 20 to be of the same general overall size, but because of the different position of the notch 242 in the shank 222, the orientation of the slug 228 when the reference faces 262 and 254 are applied to the faces 246 and 244 of the notch 242 in the manner previously indicated, will be different.

In the final hand shaping of the slug 228, after the same has been soldered in position on the shank 222, to produce the desired contour including the various relief angles, any cutting radius which may be specified and the table portion 270, portions of the shank 222, as well as of the slug 228 and diamond 100 are removed. In FIG. 6, the outlines of the relieved areas in the original shank, slug and diamond have been illustrated in broken lines.

The previously described advantages which accrue from the method of forming the tool 20 are applicable to the tool 220. The upper surface 232 of the shank 222 may be ground down below table level, or, alternatively, the insert 226 may be shimmed outwardly and upwardly as heretofore described in connection with the shimming of the compact 28.

The method involved in producing any given design of tool may vary considerably in its details, but the basic principles of the method remain substantially the same in every instance. Briefly, these principles are attained by first selecting a diamond for size, quality and approximate shape, bearing in mind, of course, the particular use to which the diamond is to be put and the orientation which it shall assume relative to the tool outline. The method is illustrated herein in connection with the formation of an exemplary tool such as has been described in detail above and wherein the three principal crystallographic axes of the diamond in the final mount have deviation angles of 0°, 25° and 0° respectively, the reference being with respect to space. The selected diamond is in the form of a slab 100 which, before shaping operations thereon are effected, has an outline such as has been shown in FIGS. 7, 8 and 9. It is contemplated, however, that other diamond shapes may be selected, one of the two sections of a round stone which has been sawed into two parts constituting a shape which frequently is useful in connection with the present method.

The selected slab 100 is positioned on one end of a temporary dop 102 (FIG. 7) which is shown herein as being cylindrical but which is not necessarily so. The slab is positioned on the upper end face 104 of the dop with one flat face of the slab resting squarely on the face 104 and with the slab making tangential contact with the extension of the cylindrical outline of the dop, or, in other words, touching the circular periphery of the end face 104. The slab may be maintained on the end face 104 by the application thereto of a suitable adhesive.

The dop 102, with the diamond slab 100 resting thereon, is placed in an upright position in the cylindrical mold cavity 105 of a suitable open-ended tubular mold 106. A quantity of molding powder 108 is placed in the mold cavity 104, after which, under the influence of heat which is applied to the mold and of pressure which is applied to the molding powder by a piston 109, the previously mentioned slug 28, with the slab 100 embedded therein, is produced. Although a hot-pressing operation has been described above, it is contemplated that the slug 28 may be formed by a suitable and equivalent casting operation involving the pouring of molten metal.

Figure 16:
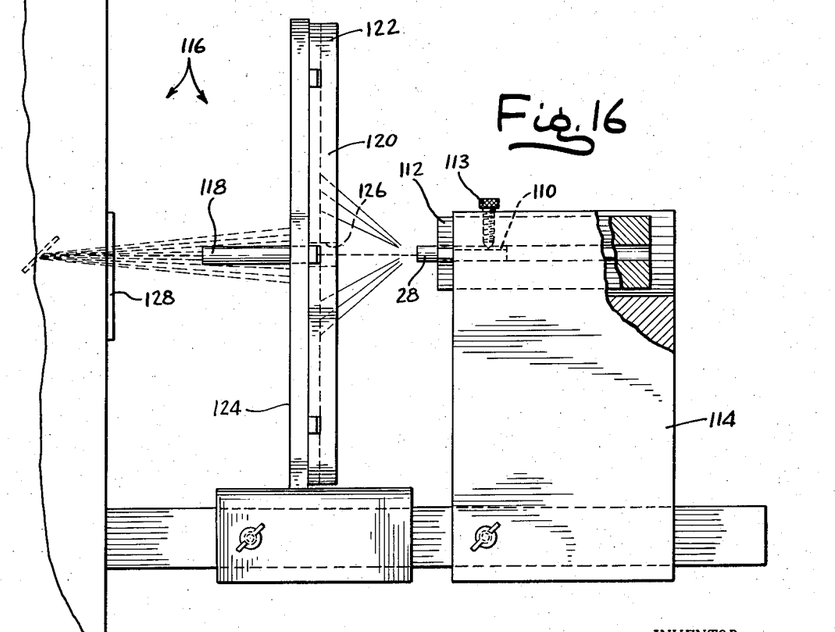
FIG. 16 is a side elevational view, schematic in its representation, of an X-ray diffraction instrument and its associated diamond target-supporting fixture employed in connection with the present method.

After the slug 28 has been removed from the mold 106 it is grooved or fluted as at 110 (FIGS. 10 and 16) to establish a fiducial reference indicia by means of which the slug 28 may be accurately positioned in a fixture block 112 and secured therein by a set screw 113. The block 112 is positioned in a V-rest 114 associated with a conventional X-ray diffraction apparatus 116 (FIG. 16). The various parts are adjusted so that the flat exposed face of the diamond slab 100 within the slug 28 will lie on the axis of the collimator tube 118 and at the proper distance wherein back reflection patterns will be appropriately directed to the X-ray film 120 which is carried by the usual cassette 122, which, in turn, is carried on a frame 124. The frame 124 serves to support the X-ray collimator tube 118 and the forward end of the latter is in register with a central opening 126 provided in the film 120. The cassette 122 is mounted on the front of the tube 118 to receive Laue back reflection patterns issuing from the diamond slab 100, the crystallographic pattern of which is to be recorded on the film 120. Upon energization of the X-ray tube 128, the necessary exposure is made and the results thereof are recorded on the film in the form of diffraction pattern which is fiducially referenced with respect to certain radiographic axes resulting from engraved reference indicia on the cassette.

The diffraction apparatus 116 is of conventional design and may be identical with or similar to the diffraction apparatus shown and described in my prior Patent No. 2,896,477 above referred to. For a more detailed understanding of such apparatus, reference may be had to such patent.

Figure 17:
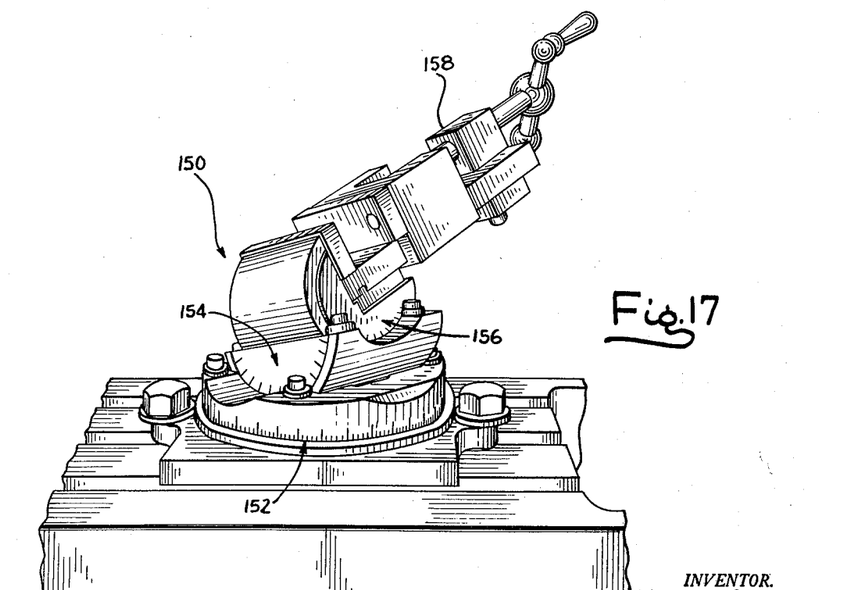
FIG. 17 is a perspective view of a goniometer vise employed in connection with the present method.

After the X-ray pattern has been obtained in the manner outlined above, the slug 28 is positioned in a goniometer vise instrument such as has been illustrated in FIG. 17 and designated in its entirety at 150. The illustrated goniometer vise 150 may be of conventional design and it is provided with the usual three scales 152, 154 and 156, respectively. The slug is held in a suitable fixture block (not shown) which may be similar to the fixture block 112. The fixture block, in turn, is held in the vise proper 158 of the instrument 150, and the three scales 152, 154 and 156 of the goniometer vise are adjusted by reading the X-ray film to ascertain the three angles of crystal axis deviation of the diamond from the fiducial reference indicia on the slug, and placing these readings in the respective vise scales. The diamond now sets true to space with reference to the desired standard atomic planes of the diamond although the physical outline of the slug does not necessarily set true to space. Thereafter, the cutting tool 160 of a milling machine is caused to traverse the slug in such a manner as to successively mill the flat surface 62 (FIG. 11) which extends vertically in space and the flat surface 54 which extends horizontally in space. The atomic structure of the diamond will then be accurately referenced with respect to the two surfaces 62 and 54. At this point in the method, all preliminary shaping operations on the slug 28 are complete and the slug is ready for assembly upon the shank 22 which is separately shaped to receive the slug. It is to be noted at this point that the two flat surfaces 62 and 54 are preserved in the finished insert 26, these being the two surfaces which seat in the milled notch 42 of the shank 22.

To prepare the shank 22 for reception of the completed slug 28, the length of shank stock 24 (FIG. 12) is milled to provide the two side faces 44 and 46 of the notch 42. Milling is accomplished in the goniometer vise 150. Before cutting the notch 42, the compound angles which will cause the diamond to be finally oriented in the completed tool are considered with reference to the Greninger chart and X-ray film and these angles are set into the three scales 152, 154 and 156 of the goniometer vise 150 so that the length of shank stock 24, which is properly referenced fiducially when positioned in the vise, may be milled to establish the notch 42 at the necessary compound angle relative to the tool outline.

After both the slug 28 and the shank 22 have been fashioned as described above, the slug is juxtapositioned relative to the notched shank so that the diamond is on the shank centerline and the flat faces 62 and 44 of the slug 28 are brought into face-to-face engagement with the flat faces 46 and 44 of the notch 42. Silver solder is then applied to permanently secure the two parts together so that they will assume the position shown in FIG. 14.

The assembled slug 28 and shank 22 are now ready for final shaping operations to give the tool 20, including the diamond D which is embedded in the slug portion 28 thereof, its final shape. The shaping of the slug 28 to produce the insert 26 may be effected by various hand operations, it being understood that such operations take place with the insert 26 in position on the shank 22. In FIG. 15, the final shape of the insert 26 is illustrated in full lines, while the excess metal of the slug which must be removed to produce such final shape is shown in dotted lines. The excess portion of the original diamond slab 100 which is removed during these operations to produce the finished diamond 30 has been shown in broken lines. These shaping operations are effected to shape the tool 20 to specifications of rake and relief angles, cutting radius table, and all other external surfaces which are required on the finished tool. The final shaping operation is performed upon the table 70 which, in the illustrated form of tool, assumes a horizontal condition above the level of the upper face 32 of the shank 22. Because of its elevated exposed position, as previously described, no interference to the polishing tool is offered by any portion of the shank, nor is any interference offered when this table is repolished after the outline of the tool 20 has been altered, either by the shimming operation described above in connection with FIG. 5, or by grinding the upper face 32 of the shank 22 to lower the level thereof relative to the table 70. The relief areas 58 and table area 70 are produced during these shaping operations with the polishing of the table area 70 and the coplanar face 56 of the insert being the last operation resorted to.

The basic method steps involved in the production of the tool 20 are applicable to the production of the tool 220 shown in FIG. 6 and previously described in detail. In FIG. 18, the slug 228 and the shank 222 which has been prepared for reception of the slug are shown separately in exploded fashion. In this view, the final shapes of both the shank 222 and the insert 226 have been shown in full lines. The excess metal of the shank 222 which may be removed during final shaping operations of the assembled shank and insert has been shown in dot-dash lines. The metal removed from the insert has been shown in dotted lines, and the portion of the diamond 300 which has been removed is shown in broken lines.

While the method of the present invention has been described herein in connection with the formation of two illustrative forms of composite tools, it will be understood that the method is applicable to the formation of a wide variety of other tool forms including those having shanks made from square or otherwise rectangular tool shank stock, octagonal or other polygonal stock, cylindrical stock and the like. Similarly, the method involved is capable of variation and the specific method described herein is only one which has been developed for commercial application. For example, although the present method has been described herein for exemplary purposes as involving the cutting of the notch 42 in the shank in such a manner that the guide surface for the insert overlies the cooperating guide surface on the insert, it is within the purview of the invention to cut the notch in such a manner that the guide surface thereon will serve to project the table portion of the diamond horizontally outwardly beyond a side surface of the shank to expose the same for initial polishing or subsequent repolishing operations if desired. In other words, projection of the diamond for table exposure purposes need not necessarily be related to an upper surface of the shank and such projection thereof under the influence of the two planar guide surfaces may be effected in any direction and may be related to any external surface on the shank. Therefore, only insofar as the invention has particularly been pointed out in the accompanying claims is the same to be limited.

Having thus described the invention what I claim as new and desire to secure by Letters Patent is:

1. The method of mounting a diamond in a composite tool comprised of a tool shank and a diamond-carrying insert at the forward end of the shank, with the three principal crystallographic axes of the diamond bearing respective predetermined angular relationships with respect to the tool outline, and with a portion of the diamond exposed above the uppermost plane of the tool and the remaining portion thereof embedded in the insert, said method comprising: embedding the diamond in a metal slug by a molding operation and causing a limited surface of the diamond to remain exposed, establishing fixed reference indicia on the slug from which corresponding reference axes for the slug may be ascertained, directing a beam of X-rays onto the exposed surface of the diamond while the latter is in the slug and obtaining a crystal diffraction pattern of the diamond, ascertaining from said crystal diffraction pattern the angular deviation of said crystallographic axes of the diamond from said reference axes for the slug, respectively, placing the slug in a triaxial goniometer vise, adjusting the goniometer vise by setting the scales thereof at readings commensurate with said ascertained axes deviations respectively to thus set the axes of the diamond true to space, machining the slug while in the thus-adjusted goniometer vise to provide thereon two intersecting planar guide surfaces which extend parallel to certain of the principal crystallographic axes of the diamond, respectively, and which, consequently, extend at a right angle to each other, placing a length of shank stock in the goniometer vise, adjusting the goniometer vise by setting the scales thereof at readings which are computed on the basis of design angles superimposed upon the previous readings of the scales, respectively, to set the length of shank stock in position for machining therein a V-shaped notch providing two counterpart planar guide surfaces which extend at a right angle to each other and which, when the slug is seated in the notch with its guide surfaces positioned in face-to-face relationship with said first mentioned guide surfaces, respectively, will set the diamond so that its crystallographic axes will bear a predetermined desired relationship with respect to the shank outline, machining the length of shank stock while in the goniometer vise to provide thereon such counterpart guide surfaces, seating the slug squarely in said notch with its guide surfaces in face-to-face contact with the guide surfaces on the length of shank stock with a portion of one guide surface on the slug underlying and overhanging an edge of its counterpart guide surface on the length of shank stock, bonding the thus seated length of shank stock and slug together, and machining the thus assembled length of shank stock and slug as a unit to remove excess metal therefrom and produce a shank and insert which, collectively, have the desired tool outline.

2. The method of mounting a diamond in a composite tool comprised of a tool shank and a diamond-carrying insert at the forward end of the shank, with the three principal crystallographic axes of the diamond bearing respective predetermined angular relationships with respect to the tool outline, and with a portion of the diamond exposed and the remaining portion thereof embedded in the insert, said method comprising: embedding the diamond in a metal slug by a molding operation and causing a limited surface of the diamond to remain exposed, establishing fixed reference indicia on the slug from which corresponding reference axes for the slug may be ascertained, directing a beam of X-rays onto the exposed surface of the diamond while the latter is in the slug and obtaining a crystal diffraction pattern of the diamond, ascertaining from said crystal diffraction pattern the angular deviation of said crystallographic axes of the diamond from said reference axes for the slug, respectively, placing the slug in a triaxial goniometer vise, adjusting the goniometer vise by setting the scales thereof at readings commensurate with said ascertained axes deviations, respectively, to thus set the axes of the diamond true to space, machining a planar face across the slug and its embedded diamond to further expose a flat surface on the diamond and provide on the slug a flat guide surface which extends parallel to an atomic plane of the diamond, machining a second planar face across the slug and provide thereon a guide surface which extends parallel to another atomic plane of the diamond and at a right angle to the first machined planar face, machining a length of shank stock to provide thereon two counterpart guide surfaces which extend at a right angle to each other and which bear such predetermined directional relationships to the shank outline that when positioned in face-to-face relationship with said first mentioned guide surfaces, respectively, they will set the diamond in the shank so that its axes will bear a predetermined desired relationship with respect to the shank outline, positioning said guide surfaces in such face-to-face relationship with a portion of one guide surface on the slug overhanging an edge of its counterpart guide surface on the length of shank stock, bonding the thus positioned slug and length of shank stock together, and machining the thus assembled length of shank stock and slug as a unit to remove excess metal therefrom and produce a shank and diamond-carrying insert which collectively have the desired tool outline.

3. The method of mounting a diamond in a composite tool comprised of a tool shank and a diamond-carrying insert at the forward end of the shank, with the three principal crystallographic axes of the diamond bearing respective predetermined angular relationships with respect to the tool outline, and with a portion of the diamond exposed and the remaining portion thereof embedded in the insert, said method comprising: embedding the diamond in a metal slug by a molding operation and causing a limited surface of the diamond to remain exposed, establishing fixed reference indicia on the slug from which corresponding reference axes for the slug may be ascertained, directing a beam of X-rays onto the exposed surface of the diamond while the latter is in the slug and obtaining a crystal diffraction pattern of the diamond, ascertaining from said crystal difraction pattern the angular deviation of said crystallographic axes of the diamond from said reference axes for the slug respectively, placing the slug in a triaxial goniometer vise, adjusting the goniometer vise by setting the scales thereof at readings commensurate with said ascertained axes deviations respectively to thus set the axes of the diamond true to space, machining a planar face across the slug and its embedded diamond to further expose a flat surface on the diamond and provide on the slug a flat guide surface which extends parallel to an atomic plane of the diamond, machining a second planar face across the slug and provide thereon a guide surface which extends parallel to another atomic plane of the diamond and at a right angle to the first machined planar face, machining a length of shank stock to provide thereon two counterpart guide surfaces which extend at a right angle to each other and which bear such predetermined directional relationships to the shank outline that when positioned in face-to-face relationship with said first mentioned guide surfaces, respectively, they will set the diamond in the shank so that its axes will bear a predetermined desired relationship with respect to the shank outline, positioning said guide surfaces in such face-to-face relationship with a portion of one guide surface on the slug overhanging an edge of its counterpart guide surface on the length of shank stock, and with a portion of the diamond projecting upwardly above the uppermost level of the length of shank stock, releasably bonding the thus positioned slug and length of shank stock together by the application to the cooperating guide surfaces of a low melting point alloy, machining the thus assembled length of shank stock and slug as a unit to remove excess metal and diamond material therefrom and produce a shank and diamond-carrying insert which, collectively, have the desired tool outline.

4. The method of mounting a diamond in a composite tool comprised of a tool shank and a diamond-carrying insert at the forward end of the shank, with a portion of the diamond exposed and the remaining portion thereof embedded in the insert, said method comprising: creating a metal slug within which the diamond is at least partially embedded and which presents two planar surfaces which diverge at an angle of 90°, creating an elongated metal shank having a V-shaped notch presenting two planar divergent sides, and one of which faces downwardly and is inclined forwardly and upwardly relative to the longitudinal axis of the shank, seating the slug squarely within the V-shaped notch so that the planar surfaces thereof are in face-to-face contact with the planar sides of the notch, with said one face of the notch opposing said one surface on the slug, and with said one surface on the slug overhanging and underlying said one face of the notch, and with a portion of the diamond projecting upwardly above the uppermost level of the shank, releasably bonding the slug in such seated position to the shank, machining the assembled slug and shank as a unit to provide flank surfaces on the sides of the tool and a flat table on the portion of the diamond which is disposed wholly above the shank stock, and finally polishing said table with the diamond in situ within the tool to complete the tool outline and establish the outline of the insert.

References Cited in the file of this patent

UNITED STATES PATENTS

| | | |
|---|---|---|
| 2,704,705 | Gifford | Mar. 22, 1955 |
| 2,896,477 | Miller | July 28, 1959 |